US011865734B2

(12) United States Patent
Wei

(10) Patent No.: US 11,865,734 B2
(45) Date of Patent: Jan. 9, 2024

(54) SLIDE CUTTING SHEARS

(71) Applicant: Chao Wei, Irvine, CA (US)

(72) Inventor: Chao Wei, Irvine, CA (US)

( * ) Notice: Subject to any disclaimer, the term of this patent is extended or adjusted under 35 U.S.C. 154(b) by 167 days.

(21) Appl. No.: 17/394,308

(22) Filed: Aug. 4, 2021

(65) Prior Publication Data

US 2023/0057750 A1 Feb. 23, 2023

(51) Int. Cl.
*B26B 13/06* (2006.01)
*B26B 13/20* (2006.01)

(52) U.S. Cl.
CPC .............. *B26B 13/06* (2013.01); *B26B 13/20* (2013.01)

(58) Field of Classification Search
CPC ......... B26B 13/00; B26B 13/06; B26B 13/08; B26B 13/12; B26B 13/20; B26B 13/28
USPC ....................................... D8/57; 30/232, 254
See application file for complete search history.

(56) References Cited

U.S. PATENT DOCUMENTS 131,108 A * 9/1872 McElhaney ............. B26B 13/06 30/254
756,818 A * 4/1904 Benton ................... B26B 13/06 30/254
1,586,026 A * 5/1926 Caldwell ................. B26B 13/28 30/266
1,967,549 A * 7/1934 Buda ....................... B26B 13/20 30/341
2,591,014 A * 4/1952 Sansom .................. B26B 13/08 30/195
2,865,099 A * 12/1958 Blackwood ........ A61B 17/3201 30/254
3,250,001 A * 5/1966 Cercone .................. B26B 13/08 30/195
3,374,694 A * 3/1968 Eizenberg .............. B21K 11/00 30/254
3,611,570 A * 10/1971 Laurenti ................. B26B 13/28 30/268
3,651,573 A * 3/1972 Kaplan ................... B26B 13/06 30/226
3,825,020 A * 7/1974 Myers ..................... B26B 13/20 30/254
3,880,021 A * 4/1975 Hannes ................... B23P 15/40 30/254
4,007,524 A * 2/1977 Hannes ................... B26B 13/28 30/266
4,146,961 A * 4/1979 Pinto ....................... B26B 13/20 30/271
4,279,076 A * 7/1981 Jackson .................. B26B 13/00 30/254
4,422,240 A * 12/1983 Wallace .................. B26B 13/06 30/254
4,473,947 A * 10/1984 Ishida ..................... B26B 13/28 30/267
4,660,285 A * 4/1987 Pracht ..................... B26B 13/08 30/200

(Continued)

*Primary Examiner* — Jason Daniel Prone
(74) *Attorney, Agent, or Firm* — Mark S Hubert

(57) ABSTRACT

A pair of slide cutting shears that have identical cutting angles of approximately 53 degrees on the thumb and finger blades, and where the thumb blade has approximately only 40% of the top end of the blade sharpened and the remaining section of the working blade is radiused and cannot cut. The shears have a four finger grip, and adjustable bump stop and a tightenable pivot pin assembly to draw the blades closer.

5 Claims, 3 Drawing Sheets

(56) References Cited

U.S. PATENT DOCUMENTS

| | | | | | |
|---|---|---|---|---|---|
| 4,709,480 | A * | 12/1987 | Takigawa | B26B 13/06 30/254 |
| 5,079,801 | A * | 1/1992 | Peterson | B26B 13/06 30/146 |
| 5,125,159 | A * | 6/1992 | Brenton | B26B 13/20 30/232 |
| D333,416 | S * | 2/1993 | Brown, Jr. | D8/57 |
| 5,319,854 | A * | 6/1994 | Pracht | B26B 13/28 30/254 |
| 5,351,588 | A * | 10/1994 | Penoza | B26B 13/00 30/350 |
| 5,499,454 | A * | 3/1996 | Compton | B26B 13/06 30/254 |
| 5,749,147 | A * | 5/1998 | Hasegawa | B26B 13/06 30/254 |
| 6,131,291 | A * | 10/2000 | Mock | B26B 13/28 30/266 |
| D498,126 | S * | 11/2004 | Adachi | D8/57 |
| D502,070 | S * | 2/2005 | Ferman | B26B 13/12 D8/56 |
| 8,276,278 | B2 * | 10/2012 | Makoto | B26B 13/08 30/252 |
| 8,756,818 | B2 * | 6/2014 | Fitraki | B26B 13/28 30/254 |
| D773,268 | S * | 12/2016 | Usman | D8/57 |
| D815,505 | S * | 4/2018 | Usman | D8/57 |
| 9,969,092 | B2 * | 5/2018 | Liao | B26B 13/08 |
| 10,363,673 | B2 * | 7/2019 | Tsujii | B26B 13/08 |
| 10,618,187 | B2 * | 4/2020 | Milligan | B26B 13/06 |
| 10,843,352 | B2 * | 11/2020 | Cunningham | B26B 13/06 |
| D908,453 | S * | 1/2021 | Ferman | D8/57 |
| D959,939 | S * | 8/2022 | Xu | D8/57 |
| 2002/0023355 | A1 * | 2/2002 | Fujita | B26B 13/28 30/254 |
| 2005/0005456 | A1 * | 1/2005 | Wang | B26B 13/12 30/232 |
| 2006/0143930 | A1 * | 7/2006 | Adachi | B26B 13/20 30/232 |
| 2013/0327348 | A1 * | 12/2013 | Ashur | B26B 13/06 30/27 |
| 2014/0101944 | A1 * | 4/2014 | Moultrie | B26B 13/06 30/254 |
| 2015/0128427 | A1 * | 5/2015 | Linn | B26B 13/04 30/260 |
| 2015/0314460 | A1 * | 11/2015 | Wakabayashi | B26B 13/06 30/254 |
| 2018/0141222 | A1 * | 5/2018 | Takahashi | B26B 13/20 |
| 2019/0176351 | A1 * | 6/2019 | Wei | B26B 13/20 |
| 2022/0410417 | A1 * | 12/2022 | Shuman | B26B 13/20 |

* cited by examiner

SLIDE CUTTING SHEARS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to hair cutting shears, and more particularly to a pair of scissors/shears specifically crafted for "slide cutting".

BACKGROUND

Haircuts, like fine dining and sports cars, have increased in complexity. The days of a simple cut are gone. While the younger generation seeks tighter haircuts like "high tops "bursts" and "high brooks" with strips or other patterns therein, others look for layered cuts. Layering of a haircut means cutting the adjacent hairs at different lengths so as to create a "beach curl". It removes bulk, increases activation and reduces the weight up the hair strands. Basically, it adds dimension to the hair. It is a current popular style in hairdressing.

To properly layer the hair, the barber must move the scissors down the hair shaft while making repeated small cuts—while continually opening and closing the tips of the scissor blades. Conventional hair scissors must quickly and repeatedly be opened after each small "snip" by the thumb blade as the scissors travel down the hair shafts, otherwise the sharp edge of the finger blade will catch the hair shafts and snag them, causing the hair to frizz and split. Additionally, if it catches on the hair shafts, it will prevent the smooth transition from the top to the bottom of the hair so that the cuts will not occur precisely where the barber wants them and the layering look will be lost.

Thus, a pair of hair cutting shears designed for performing "slide cuts" that will retain its cutting edge, won't snag while travelling down the hair shafts and will offer cutting stroke adjustability, blade proximity adjustability, and be able to be comfortably held in a plethora of different finger configurations, would be a welcomed innovation in the hair salon industry.

BRIEF SUMMARY

In accordance with various embodiments, a pair of slide cutting shears with an improved blade, is provided.

In one aspect, a novel design in the blade, the blade angles, metal, metal treatment, blade grinding and finger grips of a pair of hair shears is provided. The novel design eliminates the need to open the shears repeatedly for the next "snip" as it slides down the hair shafts, therein reducing the strain on the hand and wrist caused by repeated scissor snips.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the terms "top and upper" and "bottom and lower" refer to a physical orientation of the shears oriented vertically with the blunt tips of the blades pointing upward.

As used herein, the term "effective working length" represents the length of the finger blade that has a sharpened edge (65 mm in the preferred embodiment) and the length of the thumb blade that has both an upper sharpened edge (28 mm in the preferred embodiment) and a lower radiused edge (37 mm in the preferred embodiment.)

As used herein, the term "approximately" with regard to the lengths of the sharpened or rounded edges means the stated lengths plus or minus 5 mm.

As used herein, the term "approximately" with regard to the ratio of the sharpened edge length to the effective working length means 40% plus or minus 5%.

As used herein, the term "approximately" with regard to the included angle of the sharpened blade with respect to a line perpendicular to the working face of the blade means the stated angle plus or minus 5 degrees.

As used herein, the term "working face of the blade" refers to the side of the blade with the sharpened edge thereon.

The present invention relates to a novel design for a pair of hair cutting scissors/shears (hereinafter "shears") designed to ease the level of skill required to make a precise "slide cut" of a patron's hair. The entire set of shears has been designed for slide cutting from the ground up including the steel, steel treatment, hand grip design, blade design, blade sharpened angles, cut adjustability and blade grinding.

Figure 2:
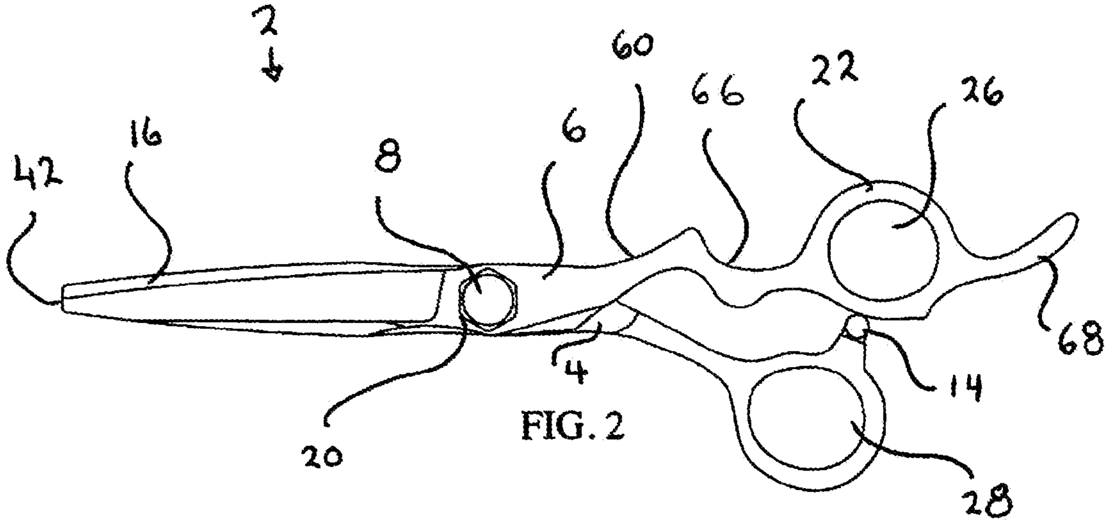
FIG. 2 is a back view of the preferred embodiment slide cutting shears.
Figure 1:
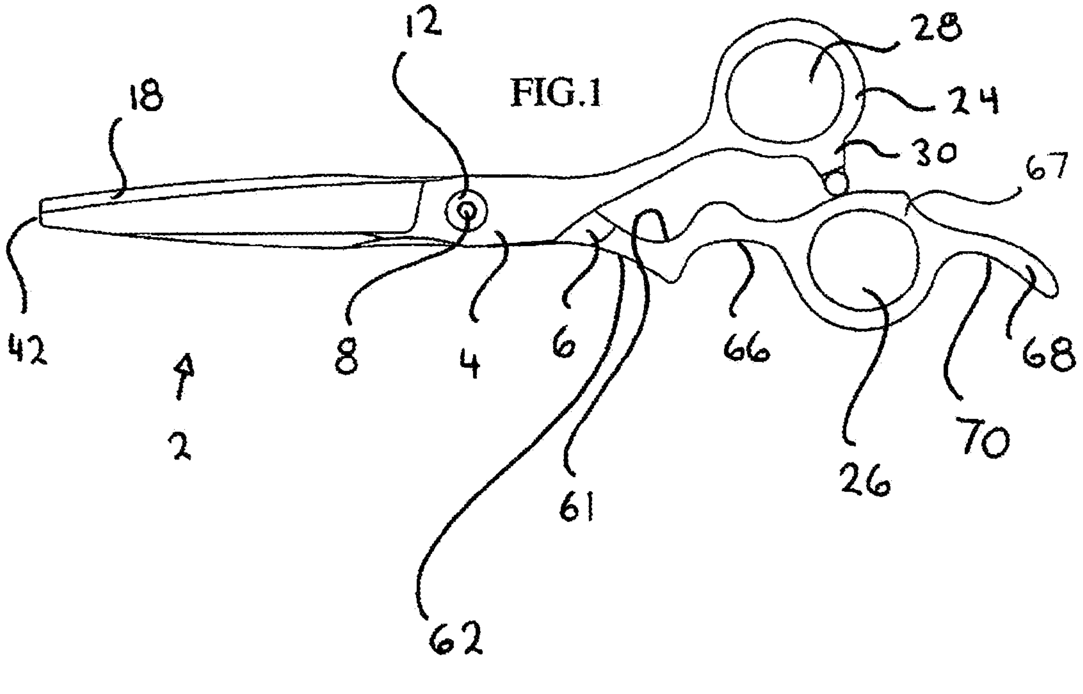
FIG. 1 is a front view of the preferred embodiment slide cutting shears.

Looking at FIGS. 1 and 2, the preferred embodiment of the slide cutting shears shows that the shears 2 are made of a thumb blade 4, a finger blade 6 an adjustable pivot pin 8, a pivot pin keeper 12 and an adjustable bump stop 14.

Looking from the front view of FIG. 1, it can be seen that the thumb blade 4 resides on top of the finger blade 6 and each blade has a pivot pin orifice formed partway up its shaft, but below the thumb blade's cutting face 16 and the finger blade's cutting face 18 (FIG. 2). In assembly, the two pivot pin orifices are aligned, with the cutting faces 16 and 18 of the two blades in pivoting contact with each other, and the pivot pin 8 (which is a bearing, preferably a ball or journal plain bearing) is placed therethrough, and its pivot pin keeper 12 lastly placed thereon to prevent the uncoupling of the pivot pin assembly. In the preferred embodiment, the pivot pin 8 has a grippable perimeter configuration formed on its proximal end that forms a finger (or wrench) tightenable grip 20. The distal end of the pivot pin's cylindrical shaft is conformed to accept the pivot pin keeper 12 as is well known in the industry. The pivot pin keeper 12 may be any one of a plethora of tightenable mechanical fasteners that affix to the distal end of the pivot pin's shaft and that may be advanced toward the pivot pin shaft's proximal end to force the blades of the shears closer together. These include, nuts, circlips, wingnuts, cross dowel joiners, shear nuts, threaded washers, joint connectors and screw posts.

In alternate embodiments the keeper 12 on the pivot pin 8 may be eliminated and the distal end of the pivot pin 8 peened over to prevent the uncoupling of the pivot pin nut assembly. This leaves the shears with no ability to tighten the blades. In still other alternate embodiments, the distal end of the pivot pin 8 may be peened over to secure the keeper 12 from release. When the pivot pin 8 is tightened via the tightenable grip, it brings the cutting face 16 of the thumb blade 4 into closer, yet still sliding contact with the cutting face 18 of the finger blade 6. This increases the friction and thus the force necessary to open and close the shears. This is a personal preference, and each hair stylist will set the "feel" of their shears.

It is to be noted that the finger blade grip 22 is designed and configured for two, three or four finger operation. That is to say that it may accommodate the index and middle fingers, the index, middle and ring fingers or the index, middle, ring and baby fingers. The finger blade grip 22 has a finger orifice 26 formed perpendicularly through the planar body of the finger blade 6 that is smaller in diameter that the thumb orifice 28 and will accommodate either the index or the middle finger depending on the hairdresser's preference of holding the shears.

The finger grip 22 of the finger blade 6 of the preferred embodiment has an inner side 61 and an outer side 60, with the inner side denoting the side that is adjacent the thumb blade 4. The outer side 60 has a four finger grip beginning as a dog leg configuration that begins below the pivot pin 8 and has in sequence a first concavity 62, a second concavity 66, a convexity 67 around the finger orifice 26 and a third concavity 70 about a tail 68 extending below the finger orifice 26. It can comfortably accommodate four fingers, three fingers or two fingers depending on the hairdresser's grip preference.

The thumb blade grip 24 has a thumb orifice 28 formed perpendicularly through the planar body of the thumb blade. Extending from the thumb blade 4 toward the finger blade 6, and residing parallel with the linear plane of the thumb blade 4, adjacent the thumb orifice 28, is a side tab 30. Into this side tab 30 is a threaded bore (not visible) residing perpendicular to the linear plane of the thumb blade 4. Into this threaded bore is a frictionally engaged an adjustable, spherical bump stop 14. This is essentially a bolt with a sphere formed at its head. It is also made of the same steel the shears 2 are to prevent galvanic cell corrosion and the loosening of the bump stop 14. The bump stop 14 abuts the inner side of the finger blade 6 at the approximate midline of the finger orifice 26, and the depth that the bump stop 14 is threaded into the threaded bore determines the end of the closing stroke, thereby setting the amount of overlap between the cutting faces of the thumb blade 4 and the finger blade 6 when the shears are fully closed. Again, this is set based on the hairdresser's preference. The less the overlap between the cutting edges, the quicker the blades can be opened. The finger and thumb blades are under extended meaning that the sharpened edge of each blade does not pivot to align or go past the trailing edges of the other blade.

Figure 3:
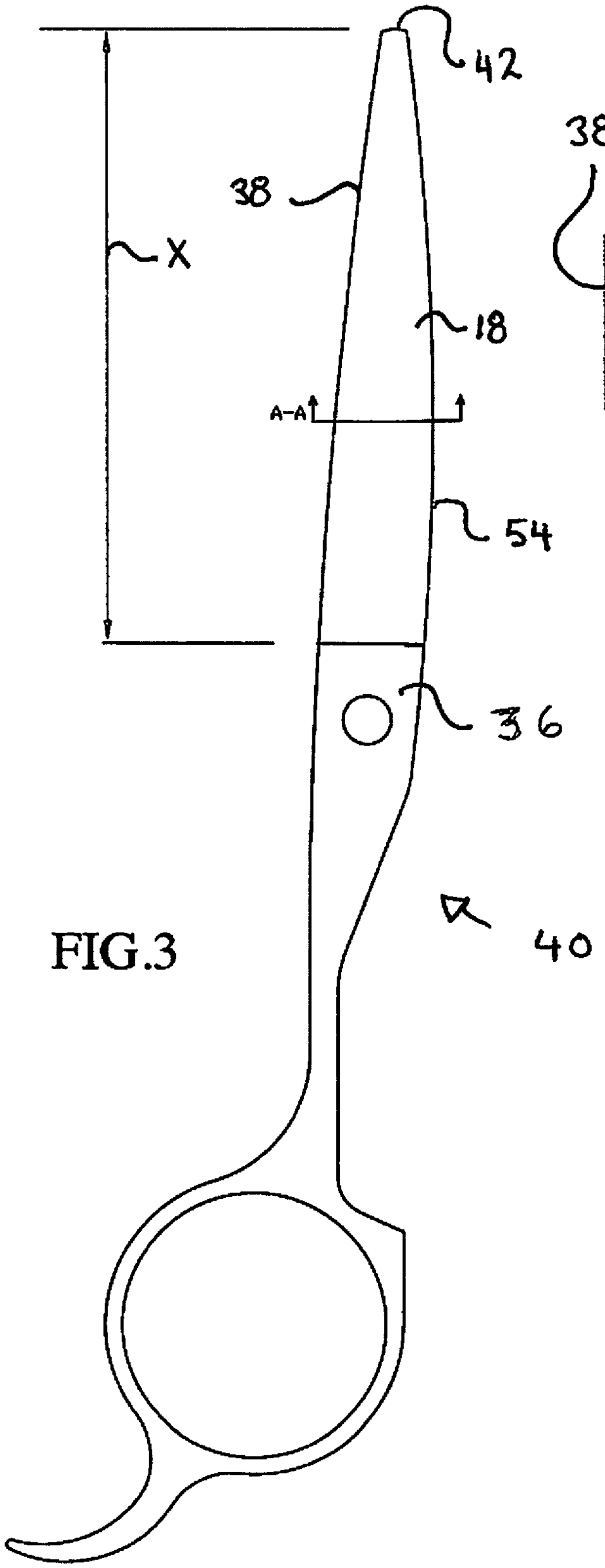
FIG. 3 is a front view of a finger blade of the alternate embodiment slide cutting shears.
Figure 4:
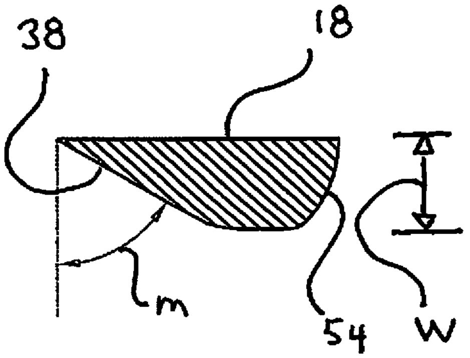
FIG. 4 is a side cross-sectional view of the finger blade of the alternate embodiment slid cutting shears taken across the A-A section line of FIG. 3.
Figure 5:
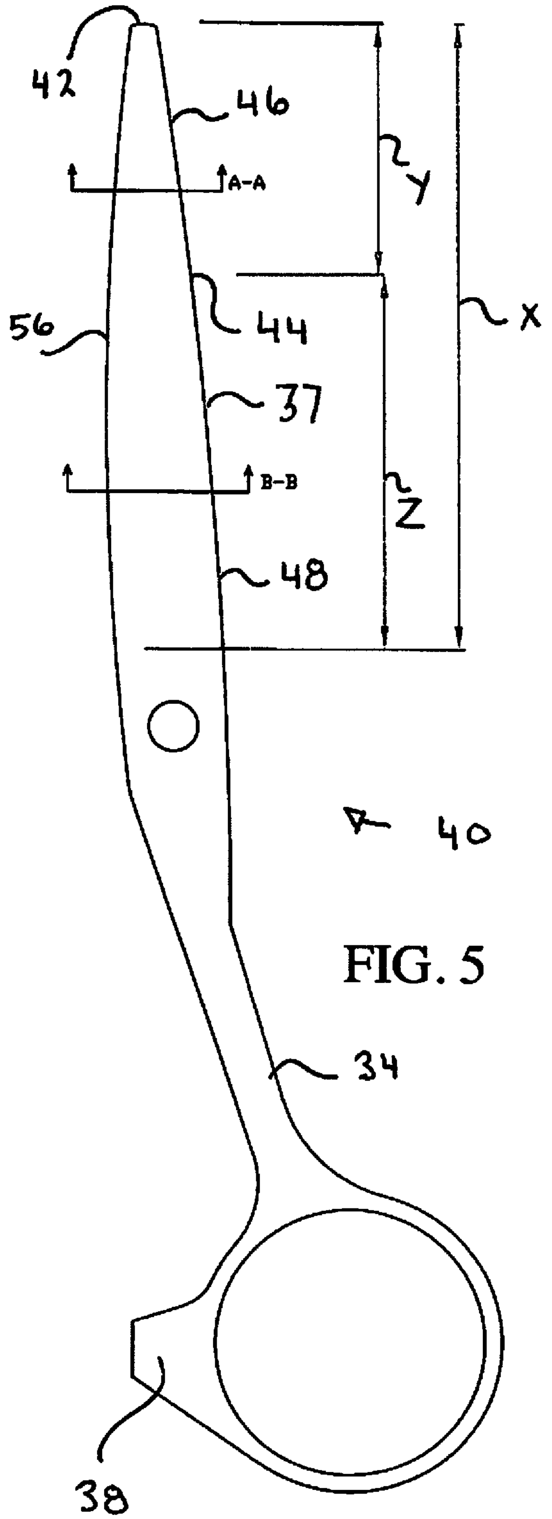
FIG. 5 is a front view of a thumb blade of the alternate embodiment slide cutting shears.

In FIGS. 3 to 7 the individually depicted thumb and finger blades are positioned as these blades are in the assembled preferred embodiment shears 2 of FIG. 1. FIGS. 3 and 5 show the thumb blade 34 and the finger blade 36 of the alternate embodiment sheers 40. Their blades, like those of the preferred embodiment shears 2, are not mirrored images of each other. Although the alternate embodiment shears 40 use a slightly different finger grip design and a fixed bump tab 38 from the preferred embodiment of FIGS. 1 and 2, the design of the cutting edges 37 and 38 of their thumb and finger blades are identical to those on the preferred embodiment shears 2.

In both the preferred embodiment shears 2 and the alternate embodiment shears 40 it can be seen that the finger blades 6 and 36 have but one sharpened edge (denoted as length line X on FIGS. 3 and 5.) This extends 65 mm from their blunted distal tips 42 to just above the pivot pin 8. This 65 mm represents the "working blade" length of both the finger blades 6 and 36 and the thumb blades 4 and 34 of the shears 2 and 40. The sharpened edges of the blades contact each other to form a cutting surface. The sharpened edge of the finger blade contacts the lower radiused edge of the thumb blade to allow slippage of the hair shafts along the shears.

FIG. 4 shows the cross section of the finger blade taken along section line A-A of FIG. 3. The sharpened cutting edge 38 of the cutting face 18 is on the left side of the finger blades 6 and 36. This sharpened cutting edge 38 tapers across the entire thickness of the finger blades 6 and 36 (designated as the length arrow Won FIG. 4) at an included angle of 53 degrees (plus or minus 5 degrees) between the perpendicular line extending from the cutting face of the blade 18 and the upper sharpened cutting edge 38 (designated by radial line M on FIG. 4.) The trailing edge of the finger blades 54 is rounded. Note, that the cutting face 18 of the finger blades is ground flat. The upper sharpened cutting edge 38 is also ground flat in the preferred embodiment, however in alternate embodiments it may be ground with a convex (Japanese style) edge or a bevel (German style) edge.

Figure 6:
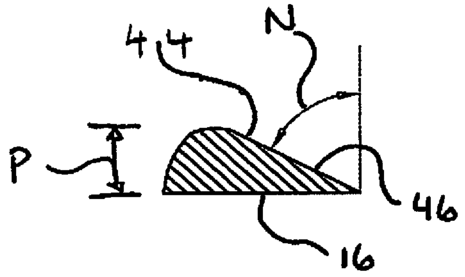
FIG. 6 is a side cross-sectional view of the thumb blade of the alternate embodiment slide cutting shears taken across the A-A section line of FIG. 5.

FIG. 6 shows the cross section of the thumb blade taken along section line A-A of FIG. 5. In cross section it can be seen that the thumb blades 4 and 34 have a short upper sharpened edge 46 on the right side of the blade, extending a length of 27 mm, (designated as Y on FIG. 5) from their blunted tip 42 to an interface 44 that occurs at the top of the radiused or lower rounded edge 48 that extends a length of 38 mm further (designated as length arrow Z on FIG. 5) to the end of the "working blade." The upper sharpened edge 46 of the thumb blade takes up approximately 40% of the top end of the "working blade" (approximately denoting 40% plus or minus 5% of the effective working blade length). This 40% of the working blade length remains consistent regardless of the length of the shear blades. This sharpened cutting edge 44 tapers across the entire thickness of the thumb blades 4 and 34 (designated as the length arrow P on FIG. 6) at an included angle of 53 degrees (plus or minus 5 degrees) between the perpendicular line extending from the cutting face of the blade 16 and the upper sharpened cutting edge 46 (designated by radial line N on FIG. 6.) The trailing edge of the thumb blades 56 is rounded. The upper sharpened edge 46 is also ground flat in the preferred embodiment, however in alternate embodiments it may be ground with a convex (Japanese style) edge or a bevel (German style) edge.

Figure 7:
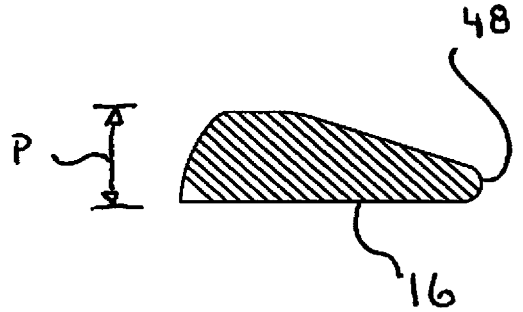
FIG. 7 is a side cross-sectional view of the thumb blade of the alternate embodiment slide cutting shears taken across the B-B section line of FIG. 5.

FIG. 7 shows the cross section of the thumb blades 4 and 34 taken along the section line B-B of FIG. 5. This lower radiused (rounded or dulled) slide edge 48 is on the right side of the finger blades 6 and 36. This lower radiused slide edge 48 runs for 38 mm from the interface 44 of the upper sharpened edge and is across the entire thickness of the thumb blades 4 and 34 (designated as the length arrow P on FIG. 7.) The trailing edge 56 of the thumb blades is rounded along its entire working length. Note, that the cutting face 16 of the thumb blades (visible only in FIG. 2), is ground flat. The short upper sharpened edge 46 is also ground flat in the preferred embodiment, however in alternate embodiments it may be ground with a convex (Japanese style) edge or a bevel (German style) edge.

It is to be noted that an approximately 53 degree cutting edge angle is a sharp deviation from the cutting angles employed on a pair of standard hair cutting shears. On pair of standard hair cutting shears, the thumb blade is sharpened at about 15 degrees (75 degrees) while the finger blade is sharpened at 45 degrees which provides a much sharper cutting action. Here, the need to prevent snagging the hair strands as the slide cutting shears moves down the hair strand bundles before cutting is critical and thus the cutting edges on the two blades have the identical angle when sharpened, minimizing the damage to the hair strands as the slide cutting shears move down their shafts.

When slide cutting with these shears, there is no need to open and close the shears to accomplish adjacent hair strands of differing lengths as the shears move down the hair strands. Rather, the bundle of hair strands closest to the roots are positioned at the bottom of the shears, and as the shears are slowly closed, they push or slide the uncut hair strands up along the radiused edge (without snagging or fraying the hair strands) until the hair strands are pushed onto the sharpened edge region of the thumb blade where the closing action of the shears cuts off those hair strands. Once those hair strands are pushed onto the sharpened edge region, they are cut and the shears can again slide freely with the diminishing bundle of hair strands until the shears are again closed a little, and the process is free to proceed again. As the shears are slid away from the hair roots and slowly closed the hair strands are cut at differing lengths, thus creating the layered cut look without the tedious repetitive opening and closing of the shears. This reduces the stress on the hairdresser's fingers and prevents the development of Carpal Tunnel Syndrome.

The preferred fabrication of the shears uses a steel that holds its edge, is not too brittle that it will nick or shatter when dropped, is rust free and highly polished for ease of disinfecting. The professed embodiment uses a specialized proprietary stainless steel called AG-16 (preferably a twice tempered stainless steel cold tempered in Liquid Nitrogen) to minimize rusting as often the hair is cut wet. It may be formed by forging, sintering or from a blank, although the preferred method of fabrication is drop forging. The stainless steel is heat treated twice to between 500 and 1000 degrees F. (which increases the flexibility but reduces the ability of the blades to keep a sharp edge) and then cold treated to below zero degrees Fahrenheit with liquid Nitrogen to a minimum of minus 150 to 300 degrees F. to make the cutting edge last longer. The blades are made with approximately 1.5 to 2.2% Cobalt (plus or minus 0.2%) included in the steel to increase the ability of the blades to hold a sharp edge. The steel composition in the preferred embodiment is as follows:

| Material | C | Si | Mn | Cr | Mo | V | Co | S | P | Ni |
|---|---|---|---|---|---|---|---|---|---|---|
| ZDF AG16 | 0.993 | 0.426 | 0.393 | 14.950 | 0.956 | 0.305 | 1.486 | 0.001 | 0.021 | 0.163 |

The shears have a minimum hardness of 56 Rc with an annealed hardness of the preferred embodiment is as follows:

| Material | Annealing Rockwell Hardness (HRC) | Rockwell Hardness (HRC) |
|---|---|---|
| ZDF AG16 | 21 | 60-61 |

While certain features and aspects have been described with respect to exemplary embodiments, one skilled in the art will recognize that numerous modifications are possible. As described herein the blades can be scaled up or scaled down but the ratio between the sharpened and dulled edge sections of the working edge of the thumb blades will always remain at approximately 40:60 (plus or minus 5%) of the working blade length. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A pair of slide cutting shears comprising:

a finger blade having a first blunted tip, a first pivot pin orifice therethrough, a first cutting face, a first leading edge, and a four finger grip sequentially formed with a first and a second external concave finger grip, an enclosed finger grip with a finger orifice therethrough and a third external concave finger grip formed about a tail extending from said enclosed finger grip;

a thumb blade having a second blunted tip, second pivot pin orifice therethrough, a second cutting face, a second leading edge opposing said first leading edge, an enclosed thumb grip with a thumb orifice therethrough, a bump tab extending therefrom said enclosed thumb grip, and a depth adjustable spherical bump stop threaded into and extending inward therefrom said bump tab; and wherein said first leading edge has an approximately 53 degree cutting angle with respect a line perpendicular to the first cutting face that extends an entire thickness of said finger blade; and wherein said second leading edge has a cutting first edge, a sliding second edge and an interface therebetween, wherein said cutting first edge has an approximately 53 degree cutting angle with respect a line perpendicular to the second cutting face that extends an entire thickness of said thumb blade, and wherein said sliding second edge is radiused across an entire thickness of said thumb blade; and a pivot pin assembly made of a pivot pin with a proximal end and a distal end, wherein said pivot pin resides between said first pivot pin orifice and said second pivot pin orifice so as to enable pivotal movement of said thumb blade and said finger blade about said pivot pin, and a pivot pin keeper, wherein said proximal end of said pivot pin has a grippable perimeter and said distal end is configured for tightenable, mating engagement with said pivot pin keeper to draw said finger blade and said thumb blade in closer proximity; and wherein said first cutting face and said second cutting face are planar; and wherein a length of said cutting first edge of said thumb blade is approximately 40% of a working blade length of said second leading edge and said sliding second edge is approximately 60% of said working blade length.

2. The sliding shears of claim 1 wherein said thumb blade leading edge does not reach or exceed a trailing edge of said finger blade when said shears are closed.

3. The sliding shears of claim 2 wherein said shears have a hardness of Rc 60 to 61.

4. The sliding shears of claim 3 wherein the thumb orifice is larger than the finger orifice.

5. The sliding shears of claim 4 wherein said shears are made of a drop forged stainless steel that contains 1.5-2.2% Cobalt plus or minus 0.2%, and that have been heat treated twice to between 500-1000 degrees F. and twice cold tempered in Liquid Nitrogen to minus 150-300 degrees F. so as to achieve a Re scale hardness of 60-61.

* * * * *